United States Patent
Frait et al.

(10) Patent No.: US 10,933,730 B2
(45) Date of Patent: Mar. 2, 2021

(54) POWER SPLIT HYBRID-ELECTRIC POWERTRAIN WITH MULTI-STEP GEARSET

(71) Applicant: Ford Global Technologies, LLC, Dearborn, MI (US)

(72) Inventors: Steven Anatole Frait, Milan, MI (US); James E. Kearns, Brighton, MI (US); Keith A. Devereaux, Roseville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/452,852

(22) Filed: Jun. 26, 2019

(65) Prior Publication Data
US 2020/0406738 A1 Dec. 31, 2020

(51) Int. Cl.
| | |
|---|---|
| *B60K 6/405* | (2007.10) |
| *B60K 6/365* | (2007.10) |
| *B60K 6/36* | (2007.10) |
| *B60W 20/10* | (2016.01) |
| *B60W 10/18* | (2012.01) |
| *B60W 10/11* | (2012.01) |

(52) U.S. Cl.
CPC ............... *B60K 6/36* (2013.01); *B60K 6/405* (2013.01); *B60W 10/11* (2013.01); *B60W 10/18* (2013.01); *B60W 20/10* (2013.01)

(58) Field of Classification Search
CPC ........ B60W 6/365; B60W 6/36; B60W 6/405; B60W 6/10; B60W 6/11; B60W 6/18
See application file for complete search history.

(56) References Cited

U.S. PATENT DOCUMENTS

| | | | |
|---|---|---|---|
| 7,706,949 B2 | 4/2010 | Sah et al. | |
| 2006/0102409 A1* | 5/2006 | Kamada | F16H 3/663 180/249 |
| 2006/0108162 A1* | 5/2006 | Tabata | B60K 6/40 180/65.23 |
| 2006/0166778 A1* | 7/2006 | Tabata | F16H 3/66 475/159 |
| 2011/0139522 A1* | 6/2011 | Takenaka | B60K 1/02 180/65.1 |

(Continued)

*Primary Examiner* — Tisha D Lewis
(74) *Attorney, Agent, or Firm* — David B. Kelley; Brooks Kushman P.C.

(57) ABSTRACT

A power split powertrain for a hybrid-electric vehicle powertrain has first and second electric machines disposed on opposite sides of a central support wall having a peripheral edge anchored to a transmission housing and a center region rotatably supporting rotors of the two electric machines on opposite sides of the support wall. A power split gearset is disposed adjacent to the first electric machine such that the first electric machine is between the first support wall and the power split gearset. A brake clutch associated with the second electric machine is mounted to the support wall and the support has a hydraulic feed channel supplying the brake clutch. Resolvers associated with the electric machines are mounted to the support wall and electrical connections with the resolvers are integrated with the support wall. A multi-step transmission assembly receiving torque from the power split gearset is also enclosed by the transmission housing.

18 Claims, 2 Drawing Sheets

(56) References Cited

U.S. PATENT DOCUMENTS

2012/0090425 A1\* 4/2012 Kasuya .................. B60K 6/405
                                                    74/661
2017/0029012 A1\* 2/2017 Tokunaga ............. B62D 7/1581
2018/0208043 A1\* 7/2018 Branning ............... B60K 6/365
2018/0372200 A1  12/2018 Kumar et al.
2019/0031012 A1  1/2019 Bird et al.

\* cited by examiner

POWER SPLIT HYBRID-ELECTRIC POWERTRAIN WITH MULTI-STEP GEARSET

TECHNICAL FIELD

This disclosure relates to the field of hybrid-electric vehicles. More particularly, the disclosure pertains to a power split hybrid-electric powertrain integrated with a multi-step gearset housed in a single housing.

BACKGROUND

Many vehicles are used over a wide range of vehicle speeds, including both forward and reverse movement. Internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Hybrid vehicle powertrains improve fuel economy by providing energy storage. In a hybrid electric vehicle, for example, energy may be stored in a battery. The battery may be charged by operating the engine to produce more power than instantaneously required for propulsion. Additionally, energy that would otherwise be dissipated during braking can be captured and stored in the battery. The stored energy may be used later to power one or more electric motors associated with the powertrain, allowing the engine to produce less power than instantaneously required for propulsion and thereby consuming less fuel.

One class of hybrid-electric vehicle powertrains, commonly referred to as a powersplit powertrain, has two sources of power. The first source includes an internal combustion engine, and the second source includes a combination of an electric traction motor, a generator motor and a battery. The engine and the generator, together with a planetary gearset, a concentric shaft and a traction motor, establish a mechanical torque flow path and an electromechanical torque flow path to vehicle traction wheels. The battery is an energy-storing device for the generator motor and the traction motor. Engine power is divided into two power flow paths at any generator speed and vehicle speed. Engine speed is controlled by the generator, which implies that the engine speed can be decoupled from the vehicle speed within the allowed speed range of the generator. This mode of operation is called "positive power split", when the generator is generating electrical power using mechanical power input from the engine.

Because of the mechanical properties of the planetary gearset, the traction motor can distribute power to the planetary gearset to drive the vehicle. This mode of operation is called "negative power split". The combination of a generator, a motor and a planetary gearset thus can be considered to have electrical continuously variable (e-CVT) transmission characteristics.

When the second power source is active, the electric motor draws power from the battery and drives the vehicle independently of the engine for both forward drive and reverse drive. The motor may also generate power and charge the battery if the engine produces power exceeding driver demand, or in a regenerative mode capturing vehicle kinetic energy. In addition, the generator can draw power from the battery and drive against a one-way clutch on the engine power output shaft to propel the vehicle in a forward direction. This mode of operation is called "generator drive mode". A vehicle system controller coordinates the two power sources so that they work together seamlessly to meet a driver's torque demand without exceeding powertrain system limits. The vehicle system controller allows continuous regulation of engine speed for any given vehicle speed and power request. The mechanical power flow path provides efficient power delivery through the planetary gearset to the driveshaft.

To employ hybrid-electric powertrains in a greater range of vehicle types, such as light- or medium-duty truck, greater torque may be required (particularly in reverse) than is achievable using the above-described architecture. To fill this need, it is possible to mate a multi-speed gearset to the output end of the power split configuration described above. The resulting powertrain has been found to be well adapted for use in front-engine/rear-wheel drive vehicles.

SUMMARY OF THE DISCLOSURE

In a disclosed embodiment of a vehicle powertrain, the powertrain comprises a transmission housing that encloses first and second electric machines having respective rotors. A first support wall is disposed between the first and second electric machines, has a peripheral region anchored to the transmission housing, and extends radially inward toward shaft axes of the respective rotors to define a center region rotatably supporting the rotors on opposite sides of the first support wall. A power split gearset is disposed adjacent to the first electric machine such that the first electric machine is between the first support wall and the power split gearset.

The powertrain may further comprise a second support wall adjacent to the second electric machine such that the second electric machine is between the first and second support walls, the second support wall having a peripheral region anchored to the transmission housing, and the second electric machine rotor further rotatably supported by the second support wall.

The powertrain may further comprise a second support wall adjacent to the first electric machine such that the first electric machine is between the first and second support walls, the second support wall having a peripheral region anchored to the transmission housing, and the first electric machine rotor further rotatably supported by the second support wall.

The powertrain may further comprise a brake clutch associated with the second electric machine mounted to the first support wall. The first support wall may comprises at least one hydraulic feed channel supplying the brake clutch.

The powertrain may further comprise at least one resolver associated with at least one of the first and the second electric machine, the at least one resolver mounted to the first support wall. An electrical connection with the at least one resolver may be integrated with the first support wall.

The powertrain of may further comprise a multi-step transmission assembly receiving torque from the power split gearset and enclosed by the transmission housing.

In another disclosed embodiment of a powertrain for a hybrid-electric vehicle, the powertrain comprises a transmission housing and a support wall inside of the housing and oriented perpendicular to a longitudinal axis of the housing. A first electric machine is mounted adjacent to a first side of the support wall and has a rotor with a shaft having a first end rotatably mounted to the support wall. A second electric machine is mounted adjacent to a second side of the support wall and has a rotor with a shaft having a first end rotatably mounted to the support wall. A power split gearset is mounted adjacent to the first electric machine such that the first electric machine is between the support wall and the power split gearset.

The powertrain may further comprise a brake clutch associated with the second electric machine, and the support wall comprising at least one hydraulic feed for the brake clutch.

The powertrain may further comprise a resolver associated with at least one of the electric machines, the resolver mounted to the support wall.

The powertrain may further comprise an electrical connection with the at least one resolver integrated with the support wall.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to have the same rotational speed about the same axis in all operating conditions. Rotating elements can be fixedly coupled by, for example, spline connections, welding, press fitting, or machining from a common solid. Slight variations in rotational displacement between fixedly coupled elements can occur such as displacement due to lash or shaft compliance. In contrast, two rotating elements are selectively coupled by a shift element when the shift element constrains them to have the same rotational speed about the same axis whenever the shift element is fully engaged and the elements are free to have distinct speeds in at least some other operating condition. Two rotating elements are coupled if they are either fixedly coupled or selectively coupled. Two rotating elements are driveably connected if a series of gears and shafts is capable of transmitting power from one to the other and establishes a fixed speed ratio between the two elements.

Figure 1:
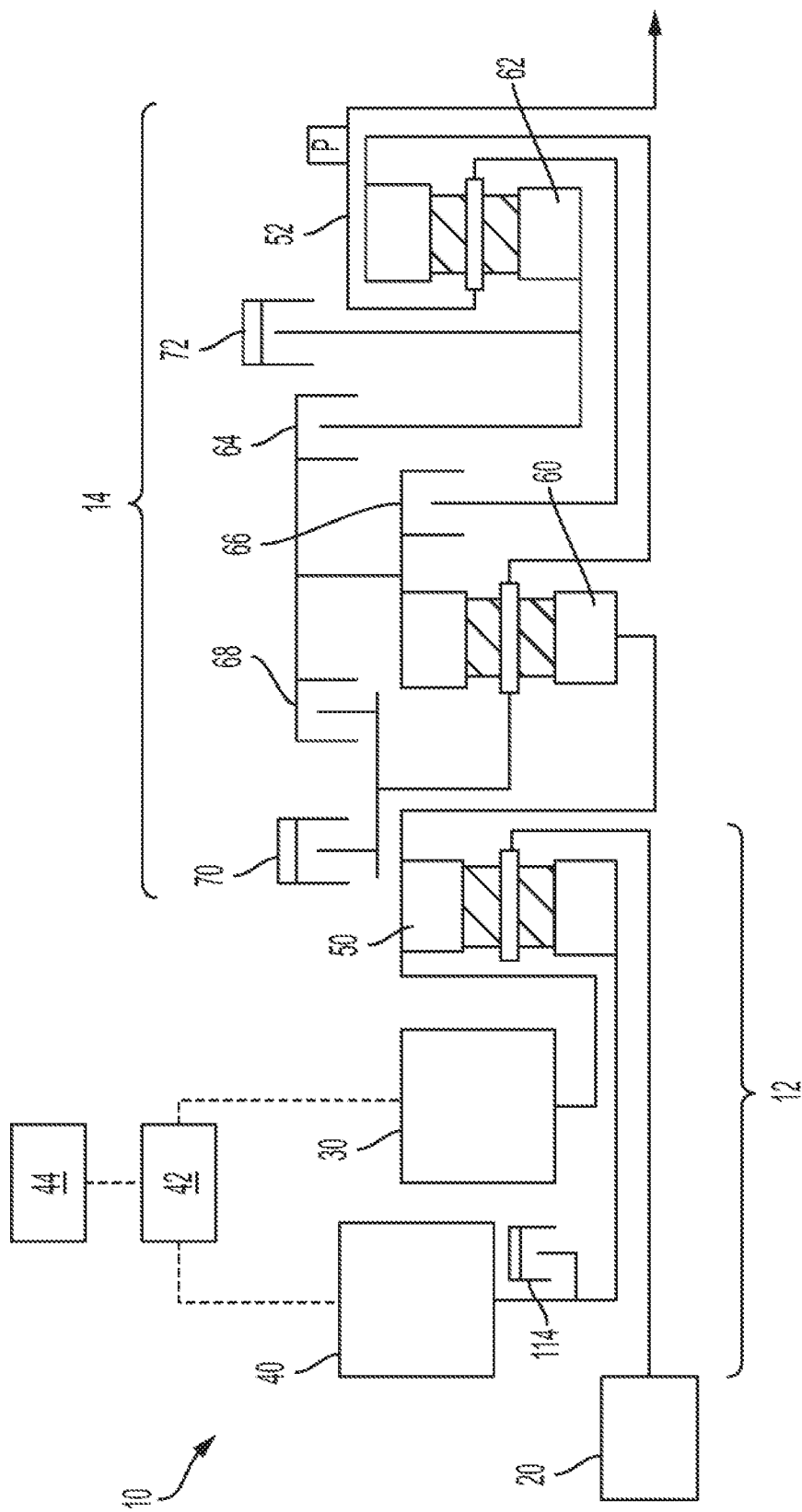
FIG. 1 is a schematic diagram of a powersplit hybrid-electric powertrain.

FIG. 1 schematically illustrates a kinematic arrangement of a powertrain 10 for a vehicle (not shown), the powertrain comprising a hybrid power split assembly 12 and a multi-step transmission assembly 14. Hybrid power split assembly 12 an internal combustion engine 20; a first electric machine (EM) 30, a second electric machine (EM) 40, and a power split gearset 50. The three potential power sources 20, 30, 40 are operatively coupled by and with the power split gearset 50, which may be a planetary unit of the type well known in the art.

First EM 30 may commonly be referred to as a traction motor while second EM 40 may commonly be referred to as a generator, since those are the functions each EM primarily serves within the complete hybrid-electric power split system. However, both EMs 30, 40 are reversible EMs, meaning that they may be operated to convert electrical power to mechanical power (motor mode) or to convert mechanical power to electrical power (generator mode). In this example, each machine is a synchronous Alternating Current (AC) motor. As is known in the hybrid powertrain art, electrical power is stored in a battery 44 and is supplied to EMs 30, 40 as directed by a motor controller 42.

Multi-step transmission assembly 14 operates in a well-known manner to receive rotary shaft power from the engine 20 and/or first EM 30 and/or second EM 40 (as determined by operation of the power split gearset 50) and, by changing discrete gear ratios, output rotary power having different torque/speed characteristics via output shaft 52. In the disclosed embodiment, multi-step transmission assembly 14 comprises two planetary gearsets 60, 62, and their associated rotating clutches 64, 66, 68 and brake clutches 70, 72. Such an arrangement is known to constitute a four-speed gearbox. It is alternatively possible for a continuously-variable transmission system (of a type that is well known in the art) to be used in place of the multi-step assembly 14.

In some circumstances, engine 20 may generate more power than is delivered to the vehicle wheels (not shown) with the excess power stored in battery 44. In other circumstances, power may flow from battery 44 to power one or both of EMs 30, 40 (via motor controller 42) permitting engine 20 to produce less power than the instantaneous demand of the vehicle. For example, the engine 20 may be off while power to propel the vehicles comes from battery 44. During braking maneuvers, first EM 30 may exert negative torque, thus producing electrical energy that is stored in battery 44 to reduce future use of engine 20. Use of first EM 30 to provide braking in this manner is called regenerative braking.

Figure 2:
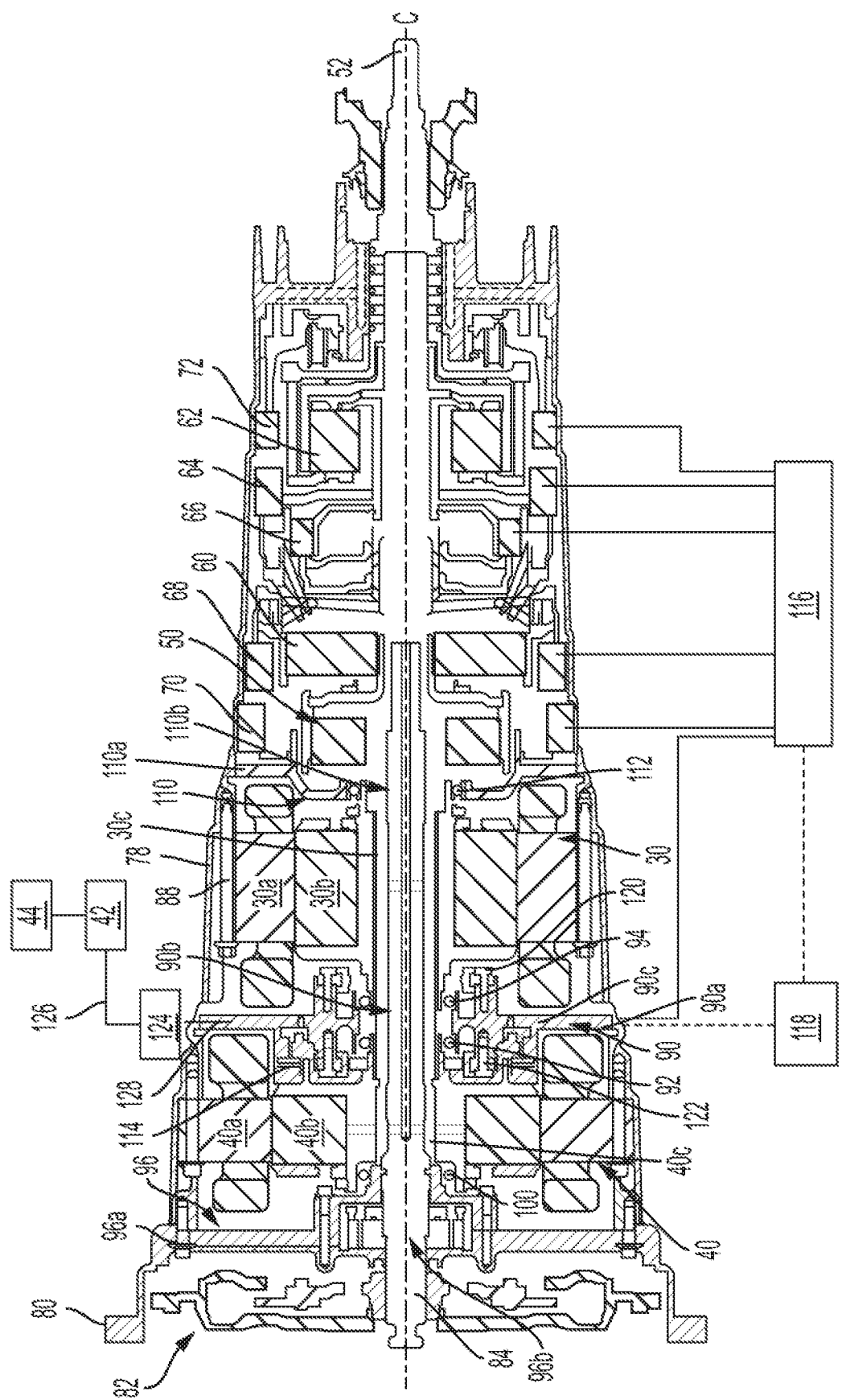
FIG. 2 is a partial cross-sectional view of a hybrid electric powertrain displaying aspects of the current invention.

FIG. 2 shows a cross-sectional view of components of powertrain 10 for a hybrid-electric vehicle having features relevant to the current invention. Powertrain 10 has a power-input end located at the left side of FIG. 2 which is configured to operatively mate with internal combustion engine 20 (see FIG. 1). Powertrain 10 further has a power-output end at the right side of FIG. 2 which is configured to operatively mate with a differential (not shown) and or other downstream components that ultimately drive one or more axles of the vehicle. Because the overall configuration of powertrain 10 is believed to be particularly well-adapted for a rear-wheel drive vehicle layout, hereinafter the power-input end will (for convenience only) be referred to as the "front end" and the power-output end will be referred to as the "rear end" if the powertrain. It is to be understood that any use herein of the terms front and rear are not intended to limit any potential orientation of the disclosed powertrain solely to a rear-wheel drive vehicle.

Powertrain 10 comprises a housing 78 that contains and operatively supports all the pertinent powertrain components described herein. Housing 78 may, for reasons to be explained later herein, advantageously be fabricated as single, integral metal component by casting or another appropriate manufacturing technique. Housing 78 has a substantially annular flange 80 at the power-input (or front) end thereof configured to be bolted or otherwise secured to the engine. A torsional damper 82 may be interposed between an engine output shaft (not shown) and a transmission input shaft 84, as is well known in the art.

In the depicted embodiment first and a second EMs 30, 40 are positioned adjacent one another and power-split gearset 50 is positioned toward the power-output end of both EMs. First and second EMs 30, 40 comprise respective first and second stators 30a, 40a that are immovably secured to the housing 78 by bolts 88 or other appropriate fastening means. First and second EMs 30, 40 further comprise respective first and second rotors 30b, 40b having respective shafts 30c, 40c that are rotatably secured to the housing 78 as described in further detail below. In the depicted embodiment, the respective longitudinal/rotational axes of shafts 30c, 40 are coaxial with a longitudinal centerline C of the powertrain.

A first or central support wall 90 is disposed between the first and second EMs 30, 40. First support wall 90 is generally annular in configuration and has a peripheral edge 90a that is secured to housing 78 by a snap-ring or other appropriate fastening means. A central opening 90b is aligned with powertrain longitudinal centerline C such that 40c may pass therethrough. Rotor bearings 92, 94 are mounted to respective front and rear sides of first support wall 90 so that the bearings are rigidly supported relative to powertrain housing 78. Rotor bearing 92 rotatably supports a rear end of second rotor shaft 40c. Rotor bearing 94 rotatably supports a forward end of first rotor shaft 30c.

A third or forward support wall 96 is disposed adjacent a power-input (forward) end of second EM 40. Third support wall 96 is generally annular and has a peripheral edge 96a that is secured to housing 78 by bolts 98 or other appropriate securing means. A central opening 96b is aligned with longitudinal centerline C such that transmission input shaft 76 may pass therethrough. Rotor bearing 100 supporting a forward end of second rotor shaft 40c is rigidly supported relative to powertrain housing 78 by third second support wall 96. In the depicted embodiment, second support wall 96 supports bearing 100 via a bracket 102 bolted to the support wall and which directly supports the bearing. Alternatively, bearing 100 may be directly mounted to third support wall 96.

A second or rear support wall 110 is disposed adjacent a power-output (rear) end of first EM 30. Second support wall 110 is generally annular and has a peripheral edge 110a that is secured to housing 78 by a snap-ring or other appropriate means. A central opening 110b is aligned with longitudinal centerline C such that power transmitting shafts may pass therethrough as necessary. Rotor bearing 112 supporting a rear end of first rotor shaft 30c is rigidly supported relative to powertrain housing 78 by second support wall 110.

The above-described mounting of both the front bearing 94 of first (rear) rotor 30b and the rear bearing 92 of the second (forward) rotor 40b on the first support wall 90 provides a significant improvement in the dimensional precision and structural rigidity of the rotor bearing installation as compared with the prior art. In known prior art arrangements, the powersplit gearset is located between the first and second EMs and no support wall (or functionally similar structural component) is present between the EMs. Instead, in prior art arrangements the front bearing of the first (rear) EM is supported by a component that extends forward from the location at which the first EM's rear bearing is mounted. Similarly, in the prior art the rear bearing of the second (forward) EM is supported by a component that extends rearward from the structural component to which the second EM's front bearing is mounted. Each of these bearing-supporting components is therefore a cantilever beam with a rotor bearing supported at its free end. The deflection under load at the free end of these cantilevers is necessarily much greater than the rigid mounting provided by the first support wall 90 as in the present apparatus. This more rigid mounting allows the EMs to be designed and construction with more precise tolerances and therefore to operate more efficiently.

A brake clutch 114 associated with second EM 40 is mounted to and supported by the first support wall 90. As is known in the hybrid powertrain art, brake clutch 114 is engaged to "brake" or "ground" the rotor 40b and thereby prevent rotation as required for certain powertrain operating modes. Brake clutch 114 is supplied with hydraulic fluid via one or more passages 90c formed within first support wall 90.

As indicated schematically in FIG. 2, a valve block 116 controls the supply of hydraulic fluid to clutches 64, 66, 68, 70, 72, and 114 as determined by an electronic transmission control unit (TCU) 118. Valve block 116 may, for example, comprise a discrete solenoid-actuated valve for each clutch. First and second resolvers 120, 122 are mounted to first support wall 90 and measure the rotational position and speed of EM rotors 30b, 40b respectively and generate low-voltage electrical signals that are communicated to the TCU 118. Mounting of both resolvers 120, 122 to the support wall 90 in close proximity to one another simplifies the control wiring connecting with TCU 118, as all of the wiring may be routed in conjunction with (within or along) the support wall. As is known in the art, numerous other sensors and other circuitry (not shown) may also electronically interface with TCU 118 to enable proper functioning of the powertrain.

A high-voltage terminal block 124 is mounted to housing 78 immediately adjacent to first support wall 90 and comprises at least one high-voltage terminal [not shown] for each phase of each of EMs 30, 40. High-voltage wiring 126 connects terminal block 124 with motor controller 42 and battery 44. High-voltage wiring 128 further extend from terminal block 124 into the housing 78, where it is routed within and/or along the support wall 90 to connect with EMs 30, 40. The positioning of the two EMs 30, 40 in close proximity to one another simplifies the wiring connections, as it allows substantially all of the high-voltage connections with the EMs to be integrated with support wall 90 and a single, compact terminal block 124. Terminal block 124 may be mounted to housing 78 at any circumferential location that is compatible with available installation space in a specific vehicle model.

Powersplit gearset 50 is located immediately rearward (toward the power-output end of powertrain housing 78) of first EM 30 and adjacent to the rear-facing side of second support wall 110. Powersplit gearset 50 is radially surrounded by brake clutch 70 associated with multi-step transmission assembly 14.

The physical layout of the hybrid powertrain disclosed herein also permits a manufacturing process that is more economical and enables more mechanical precision than similar powertrains known in the prior art. The disclosed arrangement enables the use of a powertrain housing 78 that is formed as a single, unitary component (by casting, for example) which contains all pertinent components of both the powersplit assembly 12 and the multi-step transmission assembly 14. In the prior art, those two assemblies are contained in separate housings which are bolted into connection with one another after being built up. That split-housing design introduces mechanical complexity and dimensional tolerance issues that can only have a negative impact on the resulting apparatus, those issues being avoided in the presently-disclosed design.

Positioning of the power split gearset 50 rearward of both EMs 30, 40 (rather than between them as in the prior art) enables the use of a single-piece transmission housing and leads to a reduction in overall length (the dimension measured along the longitudinal centerline C) of the powertrain in comparison with the prior art two-piece housing design. The power split gearset is nested radially inside of brake clutch 70, rather than these two components being longitudinally spaced from one another.

The disclosed apparatus is adapted for an efficient manufacturing process in which pre-built subassemblies are inserted into the unitary powertrain housing 78 and secured therein in a sequence beginning at the housing's power-output end and working toward the power-input end. The process avoids any requirement for difficult and expensive deep drilling and machining within powertrain housing 78. First, brake clutch 72 is inserted and seated within housing 78 immediately adjacent to the power-output end thereof. This is followed by the multi-step transmission assembly 14 as a substantially complete assembly comprising components 60, 62, 64, 66, 68, and 70.

Next, powersplit gearset 50 along with its related shafts is inserted into housing 78 and operatively coupled with multi-step assembly 14. Second/rear support wall 110 is inserted next, along with the brake clutch 70 and rotor bearing 112 which are both mounted thereto. First EM stator 30a is bolted into housing 78, followed by rotor 30b, with the rotor shaft engaging its rear bearing 112. A unitary assembly comprising first support wall 90 and its related, attached components (bearings 92, 94, brake clutch 114, resolvers 120, 122, etc.) follows, with rotor bearing 94 engaging the forward end of the first rotor shaft 30c. Next, second EM stator 40a is bolted to housing 78, then rotor 40b is inserted with its shaft 40c engaging its rear bearing 92. Lastly, third (front) support wall 96 (along with bracket 102 and bearing 100) is secured in place.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle powertrain comprising:
   a transmission housing;
   adjacent first and second electric machines contained within the transmission housing and including respective rotors having parallel shaft axes;
   a first support wall between the first and second electric machines, having a peripheral region anchored to the transmission housing and extending radially inward toward the parallel shaft axes to define a center region rotatably supporting the rotors on opposite sides of the first support wall;
   a second support wall having a first side adjacent to the first electric machine such that the first electric machine is between the first and second support walls, the second support wall having a peripheral region anchored to the transmission housing, and the first electric machine rotor further rotatably supported by the second support wall; and
   a power split gearset adjacent to a second side of the second support wall opposite from the first side.

2. The powertrain of claim 1, further comprising a third support wall adjacent to the second electric machine such that the second electric machine is between the first and third support walls, the third support wall having a peripheral region anchored to the transmission housing, and the second electric machine rotor further rotatably supported by the third support wall.

3. The powertrain of claim 1, further comprising a brake clutch associated with the second electric machine mounted to the first support wall.

4. The powertrain of claim 3, wherein the first support wall comprises at least one hydraulic feed channel supplying the brake clutch.

5. The powertrain of claim 1, further comprising at least one resolver associated with at least one of the first and the second electric machine, the at least one resolver mounted to the first support wall.

6. The powertrain of claim 5, wherein an electrical connection with the at least one resolver is integrated with the first support wall.

7. The powertrain of claim 1, further comprising a brake clutch disposed in a radially surrounding relationship to the power split gearset.

8. The powertrain of claim 7, wherein the brake clutch is mounted to the second support wall.

9. The powertrain of claim 1, further comprising a multi-step transmission assembly receiving torque from the power split gearset.

10. The powertrain of claim 9, wherein the multi-step transmission assembly is enclosed by the transmission housing.

11. A hybrid-electric powertrain comprising:
    a housing having a power-input end and a power-output end;
    a first electric machine mounted within the housing;
    a second electric machine mounted within the housing adjacent to an end of the first electric machine facing the power-input end of the housing;
    a first support wall located within the housing and oriented generally perpendicular to a longitudinal axis of the housing, the first support wall disposed between the first and second electric machines and respective rotors of the first and second electric machines rotatably mounted to opposite sides of the first support wall;
    a second support wall located within the housing and oriented generally perpendicular to a longitudinal axis of the housing, the second support wall disposed adjacent an end of the first electric machine facing the power-output end of the housing and the rotor of the first electric machine further supported by the second support wall; and a power split gearset operatively connected to the first and second electric machines and mounted within the housing adjacent to a surface of the second support wall opposite from the first electric machine.

12. The powertrain of claim 11, further comprising a brake clutch associated with the second electric machine mounted to the first support wall.

13. The powertrain of claim 12, wherein the first support wall comprises at least one hydraulic feed supplying the brake clutch.

14. The powertrain of claim 11, further comprising at least one resolver associated with at least one of the first and the second electric machine, the at least one resolver mounted to the first support wall.

15. A vehicle powertrain comprising:

a transmission housing;

adjacent first and second electric machines contained within the transmission housing and including respective rotors having parallel shaft axes;

a first support wall between the first and second electric machines, having a peripheral region anchored to the transmission housing and extending radially inward toward the parallel shaft axes to define a center region rotatably supporting the first and second rotors on opposite first and second sides of the first support wall;

a power split gearset adjacent to the first electric machine such that the first electric machine is between the first support wall and the power split gearset; and a brake clutch disposed in a radially surrounding relationship to the power split gearset and mounted to a second support wall rotatably supporting the first electric machine.

16. The powertrain of claim 15, further comprising a brake clutch associated with the second electric machine, and the first support wall comprising at least one hydraulic feed for the brake clutch.

17. The powertrain of claim 15, further comprising at least one resolver associated with at least one of the first and the second electric machine, the at least one resolver mounted to the first support wall.

18. The powertrain of claim 17, wherein an electrical connection with the at least one resolver is integrated with the first support wall.

\* \* \* \* \*